(12) United States Patent
Lee et al.

(10) Patent No.: US 7,450,340 B2
(45) Date of Patent: Nov. 11, 2008

(54) HEAD DESIGN WITH OVERLAPPING COIL FOR NARROW PITCH TAPE HEAD

(75) Inventors: Edward Hin Pong Lee, San Jose, CA (US); David John Seagle, Morgan Hill, CA (US)

(73) Assignee: Hitachi Global Storage Technologies Netherlands B.V., Amsterdam (DE)

( * ) Notice: Subject to any disclaimer, the term of this patent is extended or adjusted under 35 U.S.C. 154(b) by 799 days.

(21) Appl. No.: 11/001,271

(22) Filed: Nov. 30, 2004

(65) Prior Publication Data

US 2006/0050432 A1 Mar. 9, 2006

Related U.S. Application Data

(60) Provisional application No. 60/609,017, filed on Sep. 10, 2004, provisional application No. 60/609,009, filed on Sep. 9, 2004.

(51) Int. Cl.
*G11B 5/29* (2006.01)
(52) U.S. Cl. ...................................... 360/121
(58) Field of Classification Search ................. None
See application file for complete search history.

(56) References Cited

U.S. PATENT DOCUMENTS

| | | |
|---|---|---|
| 5,452,165 A | 9/1995 | Chen et al. |
| 5,546,650 A | 8/1996 | Dee |
| 5,909,346 A | 6/1999 | Malhotra et al. |
| 5,982,591 A | 11/1999 | Folkerts et al. |
| 6,650,496 B2 | 11/2003 | Nozieres et al. |
| 6,687,083 B2 | 2/2004 | Hsiao et al. |
| 2002/0060879 A1 | 5/2002 | Sato |
| 2002/0135918 A1* | 9/2002 | Ozue et al. ............... 360/55 |
| 2003/0011922 A1 | 1/2003 | Nozieres et al. |
| 2003/0039067 A1 | 2/2003 | Hsiao et al. |
| 2004/0066579 A1 | 4/2004 | Lee et al. |
| 2006/0039082 A1* | 2/2006 | Biskeborn et al. ......... 360/129 |

FOREIGN PATENT DOCUMENTS

| | | |
|---|---|---|
| EP | 0178898 | 4/1986 |
| JP | 01082315 | 3/1989 |
| JP | 0425909 | 11/1992 |

* cited by examiner

*Primary Examiner*—David D Davis
(74) *Attorney, Agent, or Firm*—D'Arcy H. Lorimer; Lorimer Labs

(57) ABSTRACT

The structure for a closely spaced, coplanar tape head array is disclosed. Narrow pitch is obtained by utilizing an overlapping coil structure, wherein write coils of adjacent heads overlap. The overlap is made possible by placing coils of adjacent heads at different levels within the thin film structure, separated by dielectric insulating layers.

18 Claims, 12 Drawing Sheets

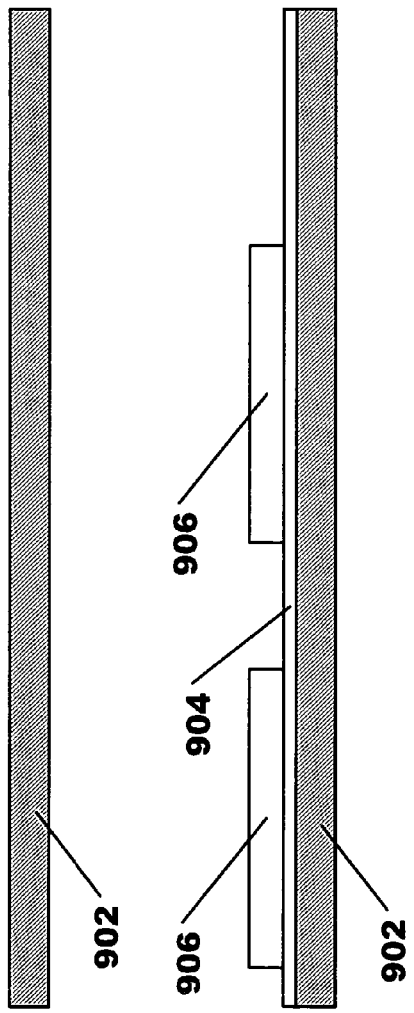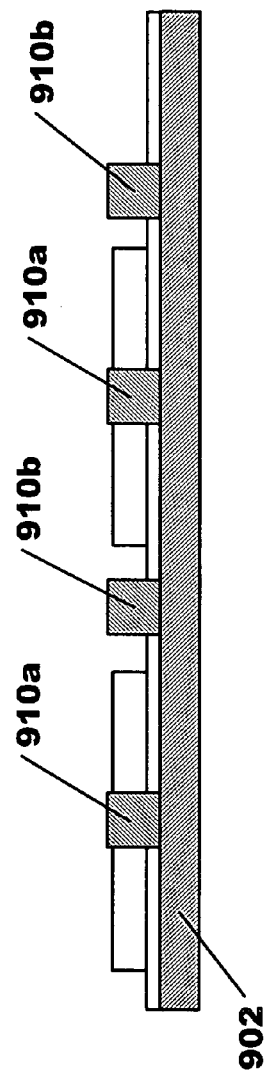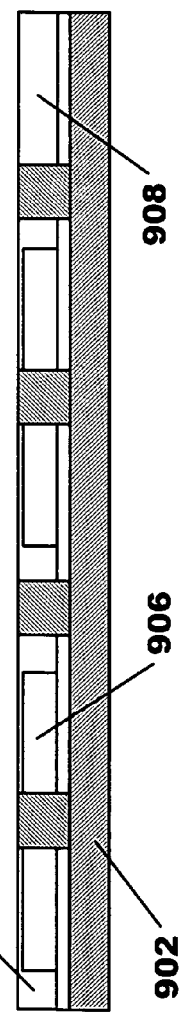

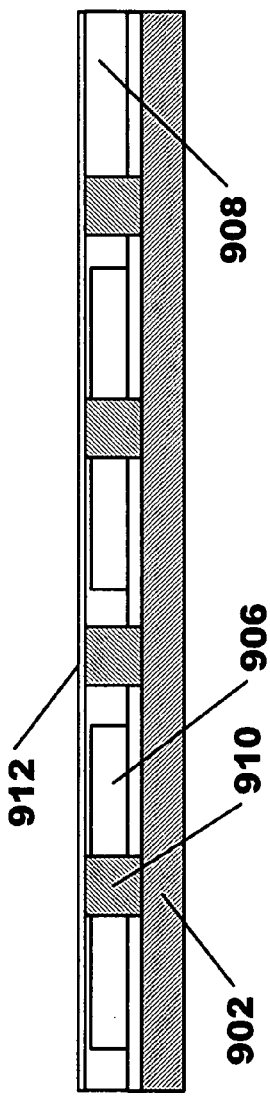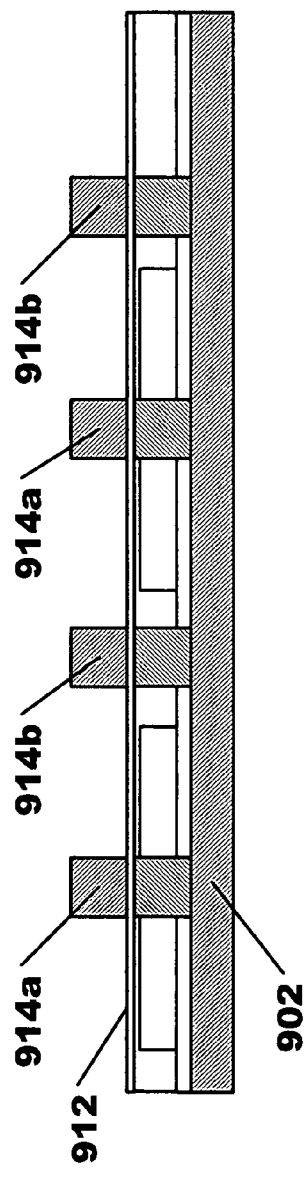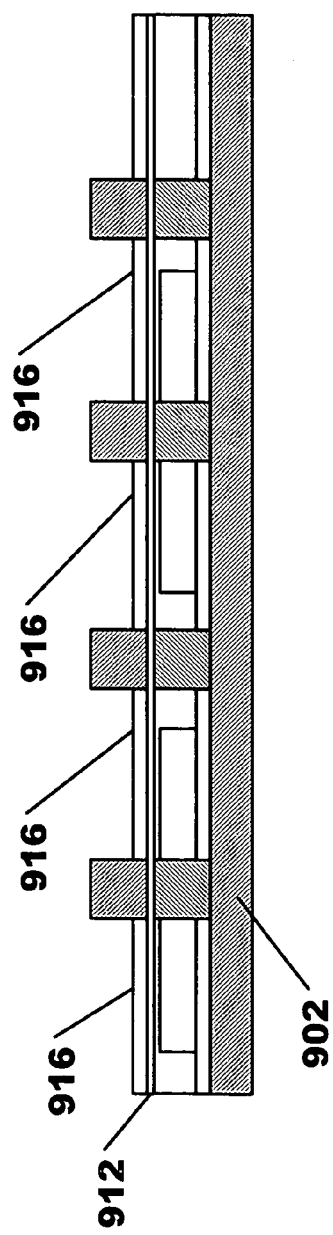

HEAD DESIGN WITH OVERLAPPING COIL FOR NARROW PITCH TAPE HEAD

REFERENCES TO PRIOR APPLICATIONS

This application is related to provisional application, reference No. 60/609,017, filed Sep. 10, 2004, entitled NARROW PITCH TAPE HEAD ARRAY USING AN ORTHOGONAL BACKGAP; provisional application, reference No. 60/609,009, filed Sep. 9, 2004, entitled HEAD DESIGN WITH OVERLAPPING COIL FOR NARROW PITCH TAPE HEAD; and claims benefit of both thereof. Provisional applications Nos. 60/609,017 and 60/609,009 are hereby incorporated by reference in their entirety.

BACKGROUND OF THE INVENTION

1. Field of the Invention

This invention relates to the construction of magnetic media read and write heads. More specifically, the invention relates to the construction of multi-layer tape head arrays having a narrow pitch.

2. Description of the Related Art

A typical tape head consists of an array of writers and readers dispositioned across a row fabricated by thin-film wafer technology. The separation between adjacent elements in an array has constraints. Consequently adjacent elements stretch across multiple tracks written in the tape. Read and Write access to all tracks is achieved by indexing the array across the tape.

One limitation on the separation between elements is to allow space for a wide coil on each write head. The width of the coil is constrained by magnetic requirements on the backgap size, number of turns and state-of-the-art coil photolithography. These limitation impose a separation much wider than the write track width and tape track pitch.

FIG. 1 is a top view of a typical write head array 100 of the prior art, with insulating layers transparent to aid in viewing relevant details. Tape or other magnetic media contacts the head array at the air bearing surface (ABS) 112. Write heads 102a-102c are located at a distance 122 from each other, which is about the width of five tracks in the example shown. Track position is determined by the center of write pole 110 of write head 102. Track location diagram 114 shows the location of tracks 116a-116c, which correspond to the write track locations of heads 102a-102c, respectively. Distance 122 is primarily determined by the width of backgap 106 in combination with the dimensions of coil 104. Yoke 108 returns the magnetic flux from write gap 110 to backgap 106.

FIG. 2 (prior art) is an air bearing surface (ABS) end view of tape head array 100 at section B-B in FIG. 1, with insulating layers 212 transparent to aid in viewing relevant details. Write heads 102a-102c are situated above shield layer 202 and insulating layer 204, respectively. Bottom pole layer 206 is situated above insulating layer and is common for all writes heads in the array. Bottom pole tip 208 is coupled to bottom pole layer 206. Upper pole tip 210 is separated from lower pole tip 208 by write gap 110. Upper pole tip 210 is coupled to yoke 108.

FIG. 3 (prior art) is a cross section view through section A-A of FIG. 2, with insulating layers transparent to aid in viewing relevant details.

U.S. Pat. No. 5,452,165 discloses a plurality of thin film magnetic heads which are arranged in a linear array with a spacing D between adjacent heads. The pole pieces of the magnetic heads are positioned in a side by side relationship in contrast to the normal pancake type of magnetic head. The linear array is angled at a skew angle theta with respect to the direction of travel of the magnetic medium. The track pitch is then D sin theta. The track width is substantially equal to the thickness of the pole tips P1T and P2T of the magnetic heads. This thickness can be in the order of 3 microns. With such a pole tip thickness the track pitch of each magnetic head in the linear array can be 3-4 microns. A plurality of narrow data tracks can then be provided with minimum pitch by a corresponding number of magnetic heads. The write signals are simultaneously fed to the heads or the read signals are simultaneously fed to the heads. This allows high data rates to be processed. The invention also provides different azimuth between adjacent heads to minimize cross talk between the tracks caused by track misregistration. Additional magnetic heads can be employed for servo control as needed.

U.S. Pat. No. 5,546,650 discloses a method of manufacturing a thin-film magnetic head having a write element capable of producing a magnetic flux density sufficient to write the high coercivity magnetic tapes at high track density. The manufacturing process requires a minimum number of lithographic steps, thereby increasing the yield of the multiple track magnetic head module. A trench is cut into the ferrite substrate material and filled with an insulator to produce a more efficient write element. A recess is then formed in the ferrite substrate having a geometry sufficient to hold a deposited thin-film conductive coil below the surface of the ferrite substrate. An insulator is then deposited on the ferrite substrate to form a gap spacer as well as to insulate the conductive thin-film coils from the ferrite substrate. The conductive thin-film coil is then deposited on the ferrite substrate in the recesses. A high-saturation flux density magnetic material is deposited on a planar nonmagnetic closure section and formed into separate magnetic pole pieces for each individual track. The magnetic pole pieces are then insulated from each other to produce a closure section having a planar surface matable with the ferrite substrate. The closure section is attached to the substrate by aligning the metal pole piece on the closure section. The magnetic pole piece is positioned in the front gap and has a width which defines the track width on the magnetic tape. The magnetic pole piece is also positioned to substantially cover the back gap region to increase the flux density existing at the front gap region.

U.S. Pat. No. 5,982,591 discloses integrated, juxtaposed head units of a magnetic head have transducing gaps directly adjacent a central plane transverse to the longitudinal direction of relative movement of a magnetic recording medium, adjacent transducing gaps being to opposite sides of the central plane. Head units adjoin each other so that a recording channel density of 100% is achieved. In one embodiment a common electrical conductor passes through a plurality of head units to one side of the central plane, and electrical connection tracks extending from a portion of the conductor form inductive transducing elements.

U.S. Pat. No. 6,650,496 discloses a matrix array of recording heads, wherein each head is independent from another both in terms of its magnetic circuit and excitation conductors. Each individual head has a planar magnetic circuit and an helical coil wrapped around the lower part of the magnetic circuit. The matrix array is collectively fabricated using full thin film technology on non-magnetic substrates. Preferably, the heads are aligned in an oblique lattice with the write gaps aligned along rows and offset by a constant value along columns. Each individual head is connected to the control electronics through interconnects to the backside of the wafer, allowing independent control of the write parameters. The die forming the device is shaped on its edges and top surface to optimize head/medium positioning and minimize wear.

U.S. Pat. No. 6,687,083 discloses a low profile inductive write head to improve track definition and head efficiency and to reduce overcoat and pole tip protrusion and cracking caused by thermal expansion. A first insulation layer of an insulation stack enclosing the coil layer is formed of an non-magnetic inorganic insulator material such as aluminum oxide, silicon dioxide or titanium dioxide having a thickness of in the range of 0.2-0.3 microns. The thinner first insulation layer results in a significantly reduced slope of the insulation stack which decreases reflective notching during processing of the second pole tip to improve track definition. Improved thermal conduction properties of the inorganic insulator material improves heat sinking of the write coil reducing overcoat and pole tip protrusion and cracking at the pole tip/write gap layer interface.

US Patent Application Publication 2002/0135918 A1 discloses a multi-magnetic recording head capable of increasing a magnetic recording density of information recorded on a magnetic recording medium. The multi-magnetic recording head includes a substrate, a pair of first thin film magnetic poles with a specific gap put therebetween, which are stacked over the substrate, and a pair of second thin film magnetic poles with a specific gap put therebetween, which are stacked over the pair of first thin film magnetic poles, wherein the pair of first thin film magnetic poles and the pair of second thin film magnetic poles are offset from each other in the direction nearly perpendicular to the stacking direction.

US Patent Application Publication 2004/0066576 A1 discloses a magnetic write head having a vertically laminated back gap structure and method of making the same. The magnetic head is formed with lower and upper pole pieces and a back gap structure which connects the lower and the upper pole pieces in a back gap region. In one illustrative example, the back gap is a vertically laminated structure having alternating layers of magnetic and non-magnetic materials. Each alternating layer is perpendicular to both the lower and the upper pole pieces. This vertically laminated structure significantly reduces the eddy currents in the back gap region at high operating frequencies as the layers are oriented in a direction parallel with the magnetic flux.

US Patent Application Publication 2002/0060879 A1 discloses a thin film magnetic head having a plurality of coils is capable of recording with higher density. A magnetic pole section for restricting a track width is formed between a lower core layer and an upper core layer, and two coil layers are tiered between a reference surface and a lower core layer through the intermediary of a coil insulating layer. This allows a magnetic path to be shortened. As a result, narrower tracks and lower inductance can be both achieved, and the narrower tracks combined with faster data transfer enable higher-density recording to be attained.

Head arrays of the prior art having a relatively large spacing can exhibit a number of disadvantages. One is the possibility of track misregistration (TMR), which is an alignment or registration error from the first track position (i.e. 116a) to the last track position (i.e. 116c) due to expansion or contraction of the magnetic media. Magnetic media, particularly tape, can expand or contract as a function of temperature or humidity. The magnitude of this error is dependent on the total distance between the first and last head positions in the array, therefore the further the heads are apart, the greater the registration error. Another disadvantage of a widely spaced head array is that data write times can be longer for a given media width and number of tracks. Closely spaced heads produce arrays having more heads per unit media width, and therefore more tracks can be written in parallel, increasing total data rates to the storage media. This may be of considerable importance in computer data back-up applications, where large hard drives need to be backed up on tape media.

In order to reduce adjacent head to head dimension 122, some designs in the prior art have used a staggered head positioning, requiring adjacent heads to be located on different levels (when viewed in the ABS view). This construction can result in higher production costs, since proportionately more layers have to be added during fabrication.

Of value would be an invention that allows a reduction of the spacing between the elements in the array while maintaining the same number of elements. Location of all elements within the same horizontal plane would be desirable to reduce fabrication costs.

SUMMARY OF THE INVENTION

It is an object of the present invention to provide a thin film head array including a first head containing a first upper pole, a first lower pole including a first lower pole tip magnetically coupled to a lower pole layer, and a first write coil disposed between the first upper pole and the first lower pole. A second head contains a second upper pole, a second lower pole having a second lower pole tip magnetically coupled to the lower pole layer, and a second write coil disposed between the second upper pole and the second lower pole. The first head is adjacent to the second head, and a portion of the first write coil overlaps at least a portion of the second write coil.

It is another object of the present invention to provide a thin film head array including a first head containing a first upper pole containing a first upper pole tip magnetically coupled to a first yoke, a first lower pole containing a first lower pole tip magnetically coupled to a first lower pole layer, a first write coil disposed between the first upper pole and the first lower pole, and a first write gap disposed between the first upper pole tip and the first lower pole tip. A second head contains a second upper pole containing a second upper pole tip magnetically coupled to a second yoke, a second lower pole containing a second lower pole tip magnetically coupled to a second lower pole layer, a second write coil disposed between the second upper pole and the second lower pole, and a second write gap disposed between the second upper pole tip and the second lower pole tip. The first head is adjacent to the second head, a portion of the first write coil overlaps at least a portion of the second write coil, and the first write gap and the second write gap lie approximately in a plane perpendicular to an air bearing surface.

It is yet another object of the present invention to provide a method for making a thin film head array including providing a substrate having a top surface, depositing a lower pole layer on the top surface of the substrate, depositing a first dielectric layer on a top surface of the lower pole layer, and forming a first coil structure of a first write head on a top surface of the first dielectric layer. The method further includes depositing a plurality of second dielectric layers, the plurality of second dielectric layers enclosing a top surface of the first coil structure. A second coil structure of a second write head is formed on a top surface of the plurality of second dielectric layers. The first write head is adjacent to the second write head, and a portion of the second coil structure overlaps at least a portion of the first coil structure.

BRIEF DESCRIPTION OF THE DRAWINGS

The present invention will be better understood when consideration is given to the following detailed description thereof. Such description makes reference to the annexed drawings, wherein:

FIGS. 9a-9j are air bearing surface end views illustrating a method of making a write head array having overlapping coils, according to an embodiment of the present invention; and, FIGS. 10a-10c are air bearing surface end views illustrating an alternative method of making a write head array having overlapping coils, according to an embodiment of the present invention.

DETAILED DESCRIPTION OF THE PREFERRED EMBODIMENTS

Figure 1:
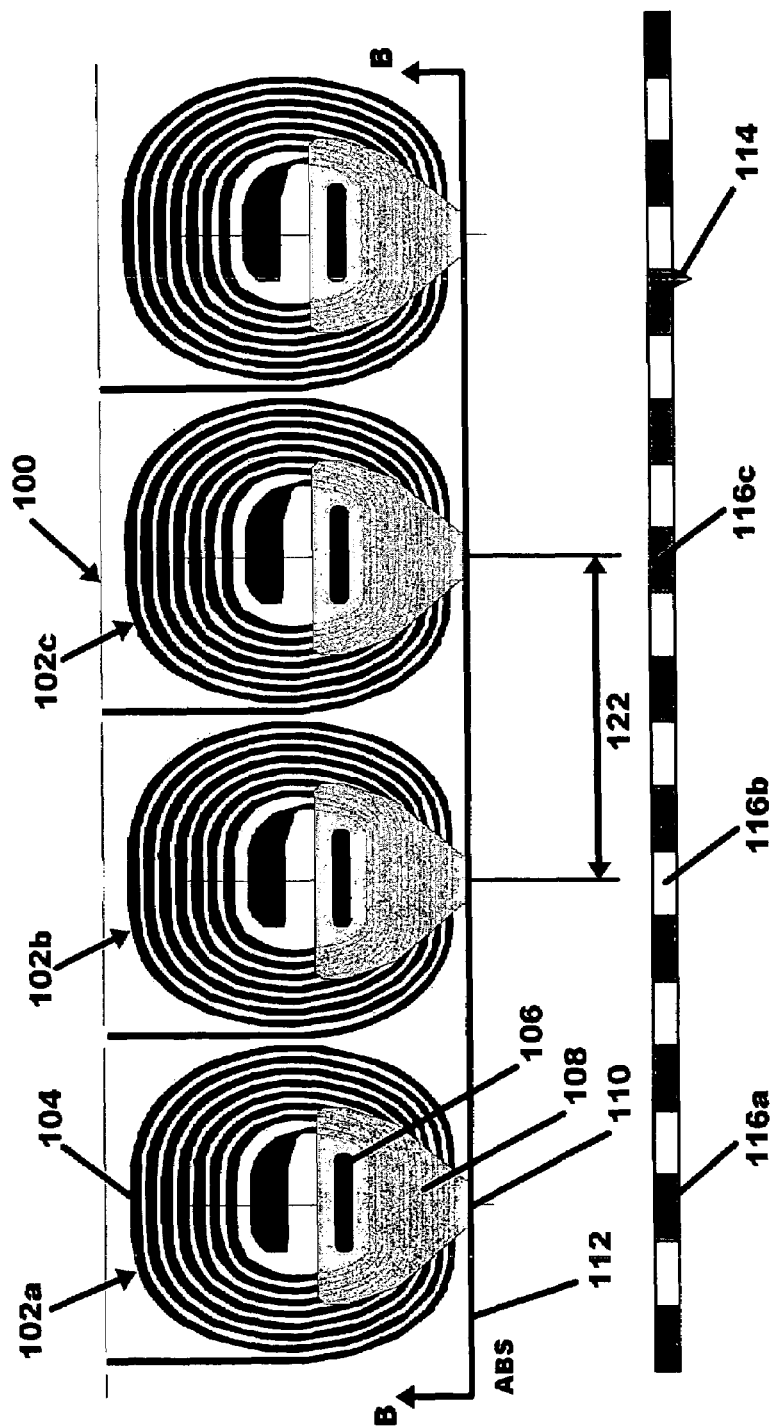
FIG. 1 (prior art) is a top view of a typical write tape head array with insulating layers transparent.
Figure 2:
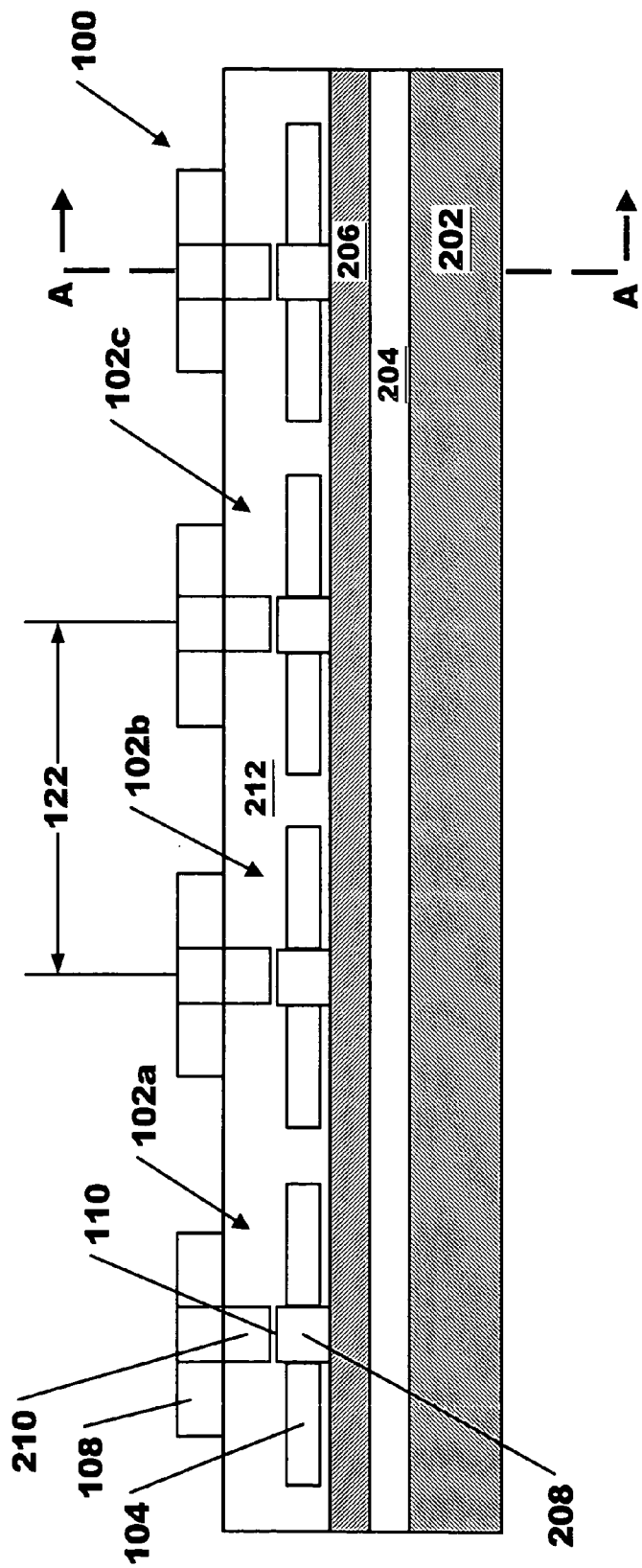
FIG. 2 (prior art) is an air bearing surface (ABS) end view at section B-B in FIG. 1, with insulating layers transparent.
Figure 3:
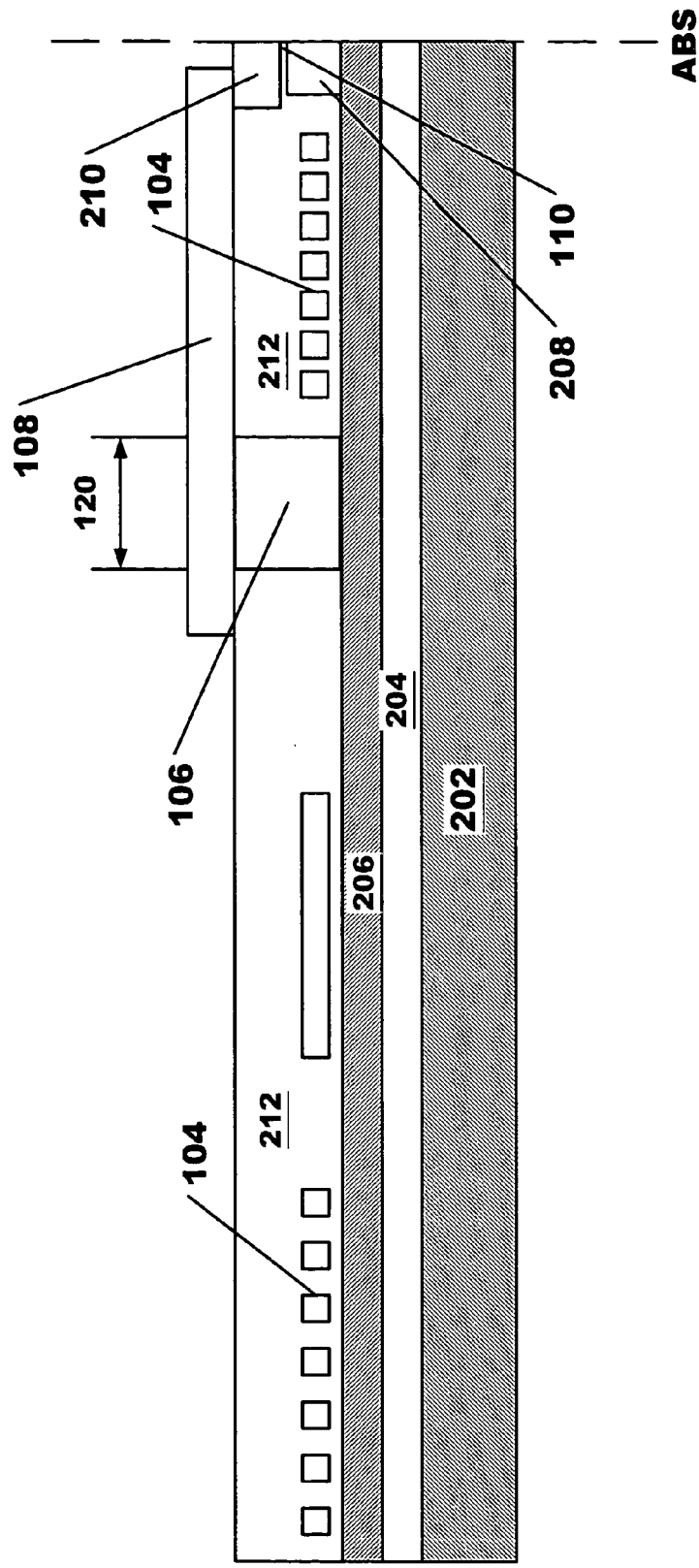
FIG. 3 (prior art) is a cross section view through section A-A of FIG. 2, with insulating layers transparent.

FIGS. 1-3 (prior art) have been discussed in the Background section above.

Figure 4:
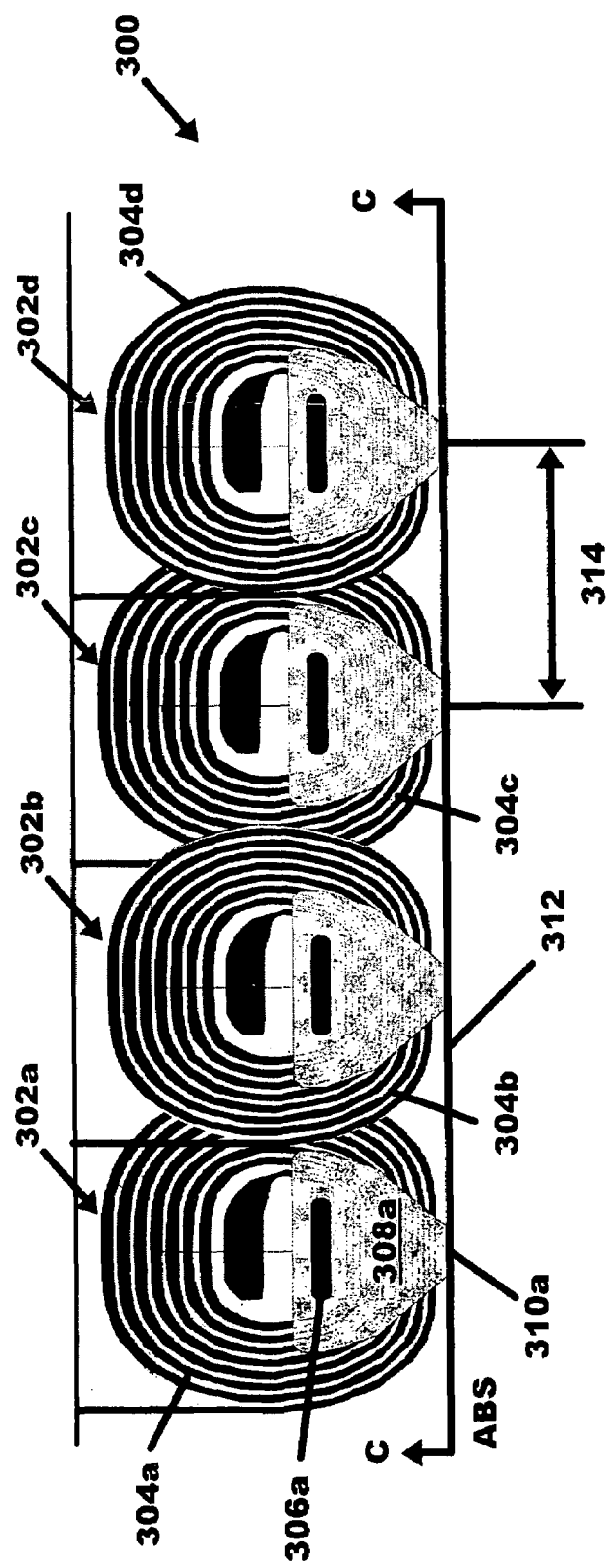
FIG. 4 is a top view of a write head array having overlapping coils, with insulating layers transparent, according to an embodiment of the present invention.

FIG. 4 is a top view of a write head array 300 having overlapping coils, with insulating layers transparent to aid in viewing relevant details, according to an embodiment of the present invention. Head array 300 is comprised of individual head structures 302a-302d. Head structures 302a and 302c have their coils 304a and 304c fabricated below coils 304b and 304d of head structures 302b and 302d. This allows coil 304b to overlap adjacent coils 304a and 304c. Likewise, coils 304d and 304b overlap coil 304c. Head to head spacing 314 is therefor reduced in comparison to spacing 122 of the prior art. An important feature of the present invention is that write gap 310a is coplanar with the write gaps of the other heads in the array 300, as will be clarified in subsequent figures. This configuration reduces the number of fabrication layers required for the array 300, reducing the cost of manufacturing. The head array 300 illustrated in FIG. 4 utilizes conventional backgap and yoke structures (for example, 306a and 308a of head 302a). However, the orthogonal backgap and yoke structures disclosed in co-pending provisional application, reference No. 60/609,017, filed Sep. 9, 2004, entitled NARROW PITCH TAPE HEAD ARRAY USING AN ORTHOGONAL BACKGAP, may also be utilized to produce head arrays of even tighter spacing.

Figure 5:
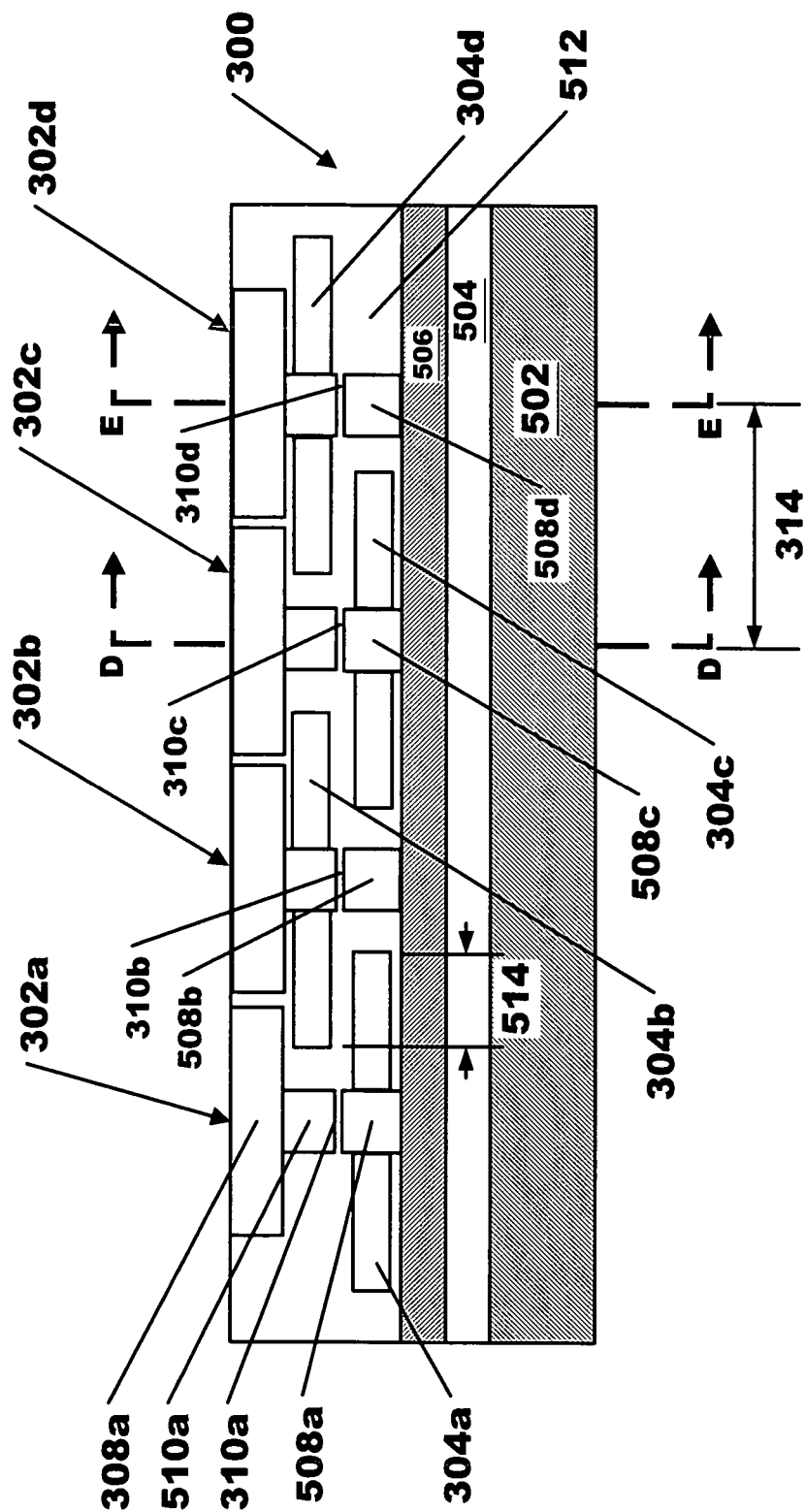
FIG. 5 is an air bearing surface (ABS) end view at section C-C in FIG. 4, with insulating layers transparent, according to an embodiment of the present invention.

FIG. 5 is an air bearing surface (ABS) end view at section C-C in FIG. 4, with insulating layers 512 transparent to aid in viewing relevant details, according to an embodiment of the present invention. Write heads 302a-302d are situated above shield layer 502 and insulating layer 504, respectively. Bottom pole layer 506 is situated above insulating layer 504 and is common for all writes heads in the array. In an alternative embodiment (not shown), bottom pole layer may be separated into discreet, isolated sections for each of heads 302a-302d. However, it is still desirable that these sections be located in the same plane above layer 504 to simplify construction and reduce fabrication costs. In head 302a, bottom pole layer 506 is in contact with bottom pole tip 508a, and together comprise the lower pole. Upper pole tip 510a is in contact with yoke 308a, and together comprise the upper pole. The upper pole tip 510a and lower pole tip 508a are separated by write gap 310a, which is generally filled with a non-magnetic, insulator material. Heads 302b-d are constructed in a similar manner. Upper pole tip 510a, yoke 308a, lower pole tip 508a, and lower pole layer 506 may be any suitable magnetic material, preferably one having a high magnetic moment such as Permalloy or other compositions of NiFe, CoFe or CoNiFe alloys, which may contain dopants or other additives known by those of ordinary skill in the art to provide desirable material properties. The specific material compositions of the upper pole tip 510a, yoke 308a, lower pole tip 508a, and lower pole layer 506 may be different, in order to optimize the function of each component. Write gap 310a may be composed of alumina or other suitable non-magnetic material. Insulating material 512 may be composed of alumina, silica, baked photo-resist, or layers and combinations of any of the foregoing materials. Details are not shown for clarity.

Coil structures 304a, 304c of heads 302a and 302c, respectively, are placed below the coil structures 304b, 304d of adjacent heads 302b and 302d, respectively. This allows coils of adjacent heads to overlap by dimension 514, allowing a tighter head to head spacing 314. Coil structures 304a-d are generally made from conductive metals as is well known to those skilled in the art, preferably copper and copper alloys. Notice that write gaps 310a-310d are located approximately in the same horizontal plane (perpendicular to the ABS), as are the lower poles, which comprise lower pole tips 508a-d and lower pole layer 506. This construction facilitates a lower production cost when compared to prior art processes using staggered head arrays. These staggered head arrays can produce tight head to head spacing, but require the fabrication of a complete head stack for each adjacent head. Thus, a four head array would contain a structure having four times the number of layers as the present invention, thus considerably increasing the cost.

Figure 6:
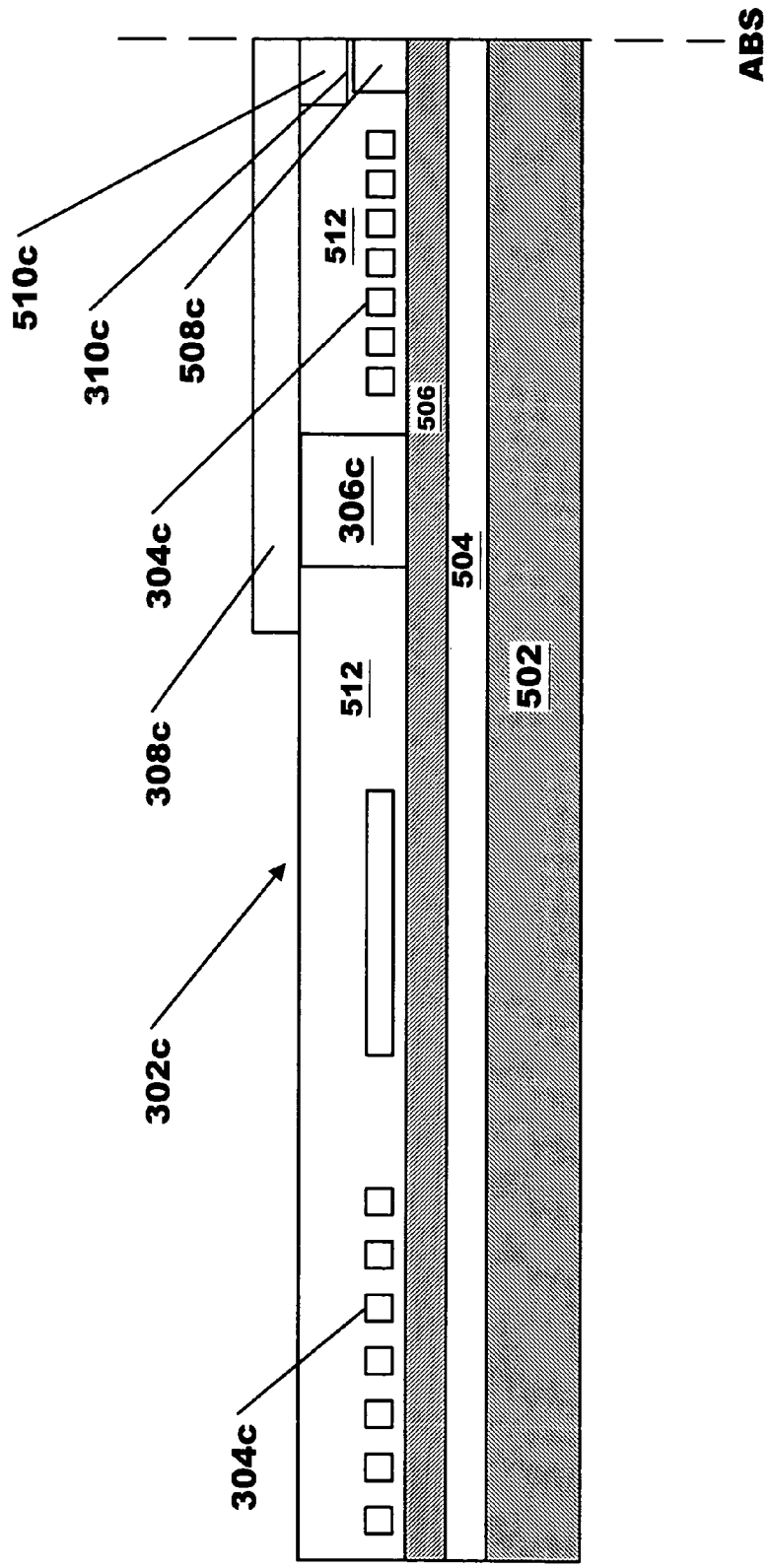
FIG. 6 is a cross section view through section D-D of FIG. 5, with insulating layers transparent, according to an embodiment of the present invention.

FIG. 6 is a cross section view through section D-D of FIG. 5, with insulating layers transparent to aid in viewing relevant details, according to an embodiment of the present invention This view is taken through the center line axis of write head 302c, perpendicular to the air bearing surface (ABS), and shows the position of coil 304c. Coil 304c is generally placed below the position of write gap 310c, although this is not a strict requirement as long as the coil position does not interfere with the coils of adjacent heads.

Figure 7:
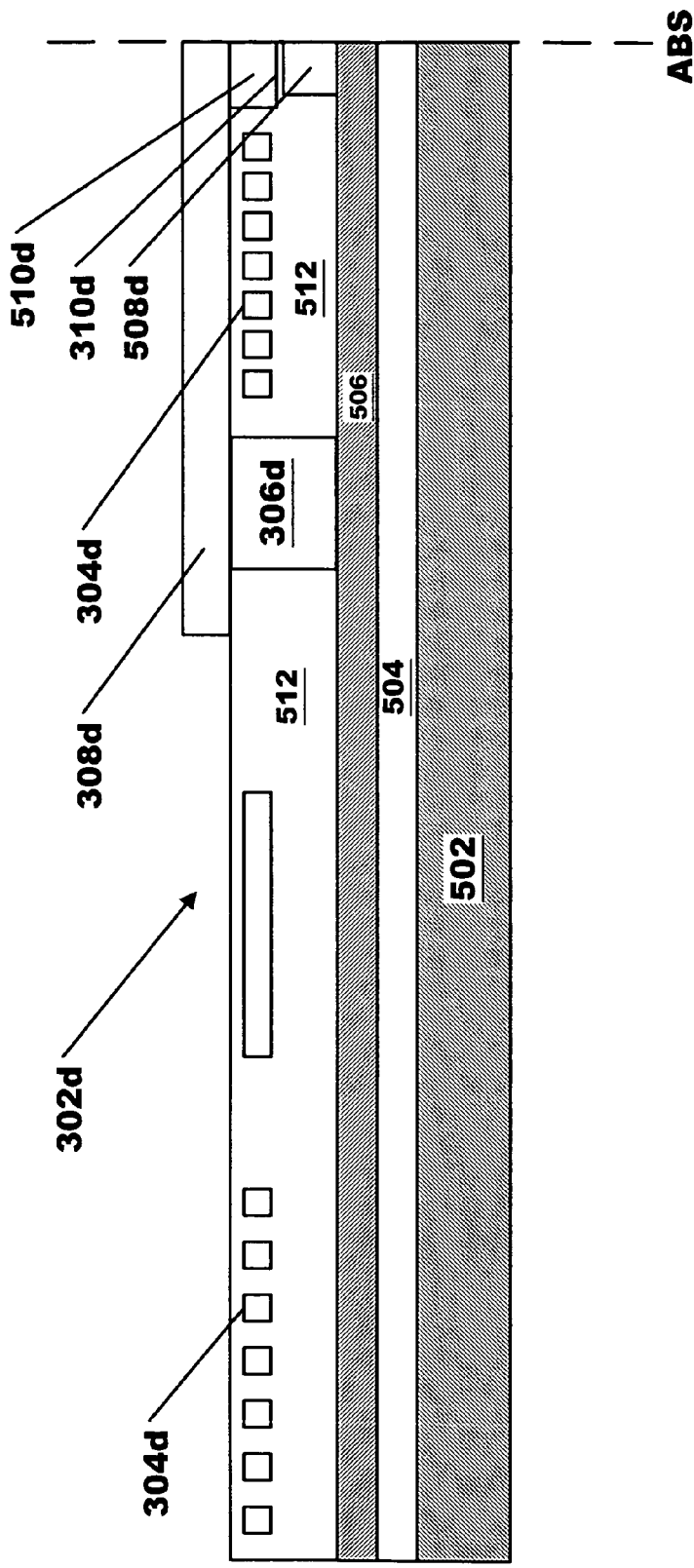
FIG. 7 is a cross section view through section E-E of FIG. 5, with insulating layers transparent, according to an embodiment of the present invention.

FIG. 7 is a cross section view through section E-E of FIG. 5, with insulating layers transparent to aid in viewing relevant details, according to an embodiment of the present invention. This view is taken through the center line axis of write head 302d, perpendicular to the air bearing surface (ABS), and shows the position of coil 304d. Coil 304d is generally placed above the position of write gap 310d, although this is not a strict requirement as long as the coil position does not interfere with the coils of adjacent heads.

Figure 8:
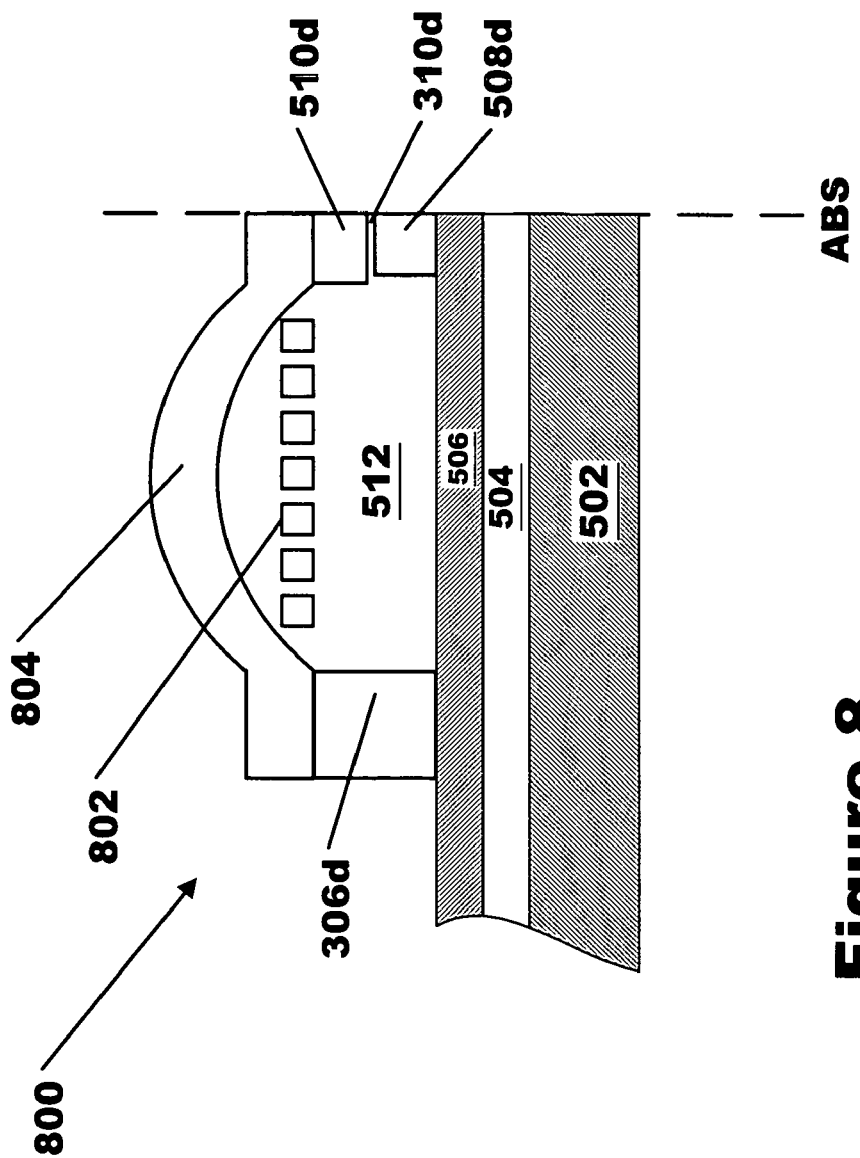
FIG. 8 is a partial cross section view of an alternative embodiment of the present invention.

FIG. 8 is a partial cross section view of an alternative embodiment 800 of the present invention. This view is taken through the center line axis of write head 302d, perpendicular to the air bearing surface (ABS), and shows an alternative position for coil 304d, now labeled 802. Generally, coil 802 is placed in this embodiment above the upper pole tip 510d. Yoke 804 is deposited over insulating layers 512 in an arch to cover coil 802.

FIGS. 9a-9j are air bearing surface end views illustrating a method of making a write head array having overlapping coils, according to an embodiment of the present invention.

In FIG. 9a, lower pole layer 902 is deposited on a substrate (not shown). As mentioned previously, layer 902 may be a continuous layer (as shown), or optionally a coplanar layer of separated segments (not shown). Layer 902 is generally composed of a magnetic material as previously disclosed, and is deposited according to methods well known in the art.

In FIG. 9b, a first dielectric layer 904 is deposited upon the top surface of lower pole layer 902. Layer 904 may be composed of any suitable insulating material, deposited in accordance with known methods. Lower coil structures 906 are then deposited upon dielectric layer 904. The intermediate steps of photo-resist deposition, imaging, development, coil electroplating, and photo-resist removal shall not be described in detail, and are well known to those skilled in the art. In accordance with the present invention, lower coil structures 906 are placed at locations corresponding to every other write head in the array, as illustrated in FIGS. 4 and 5 discussed previously.

Figure 9H:
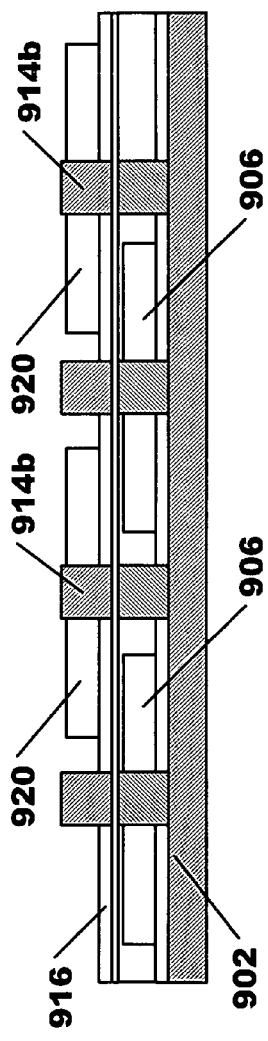
Figure 9I:
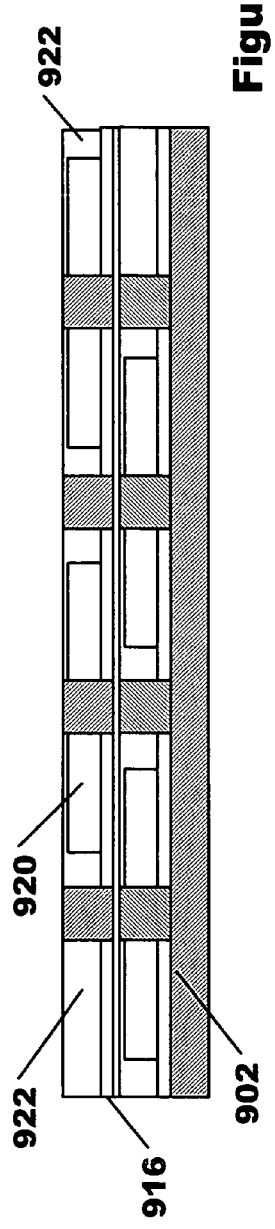
Figure 9J:
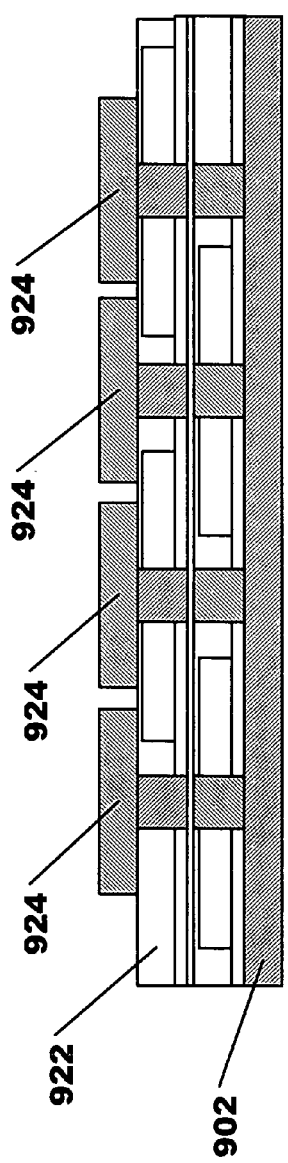

In FIG. 9c, lower pole tips 910a and 910b are deposited directly on the upper surface of lower pole layer 902. Lower pole tips 910a coupled to lower pole layer 902 comprise the lower poles of write head structures having a lower coil structure 906. Lower pole tips 910b coupled to lower pole layer 902 comprise write head structures having an upper coil structure. In FIG. 9d, insulating layer 908 is deposited on the structure as shown in FIG. 9e. CMP (chemical-mechanical-planarization) is used to planarize the structure at the top surface of lower pole tips 910a,b. Insulating layer 902 may be any suitable material, including but not limited to silica, alumina, or polymers such as polyamides and photo-resists. Preferably, alumina is used. In FIG. 9e, write gap layer 912 is deposited on the upper surfaces of pole tips 910a,b. In FIG. 9f, upper pole tips 914a,b are deposited on the upper surface of write gap layer 912. Upper pole tips 914a correspond to write heads having lower coil structures 906, and upper pole tips 914b correspond to write heads having upper coil structures. In FIG. 9g, upper coil insulating layer 916 is deposited on the upper surface of write gap layer 912. Layer 916 may be any suitable insulating material, deposited in accordance with known methods. In FIG. 9h, upper coil structures 920 are deposited on the upper surface of insulating layer 916, at locations corresponding to write heads with upper pole tips 914b. In accordance with the present invention, upper coil structures 920 overlap the lower coil structures 906 of adjacent heads. In FIG. 9i, insulation layers are placed over coil structures 920 and surface 916. Any suitable insulation material can be used, preferably alumina. CMP is then utilized to remove insulating films on the top surface of the upper pole tips 914 in preparation for adding the yoke structures. In FIG. 9j, yokes 924 are added to the top surface of upper pole tips to form completed upper poles of the thin film head array.

Figure 10A:
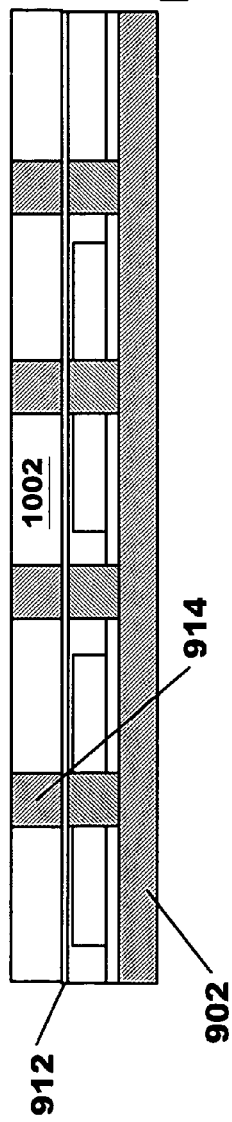
Figure 10B:
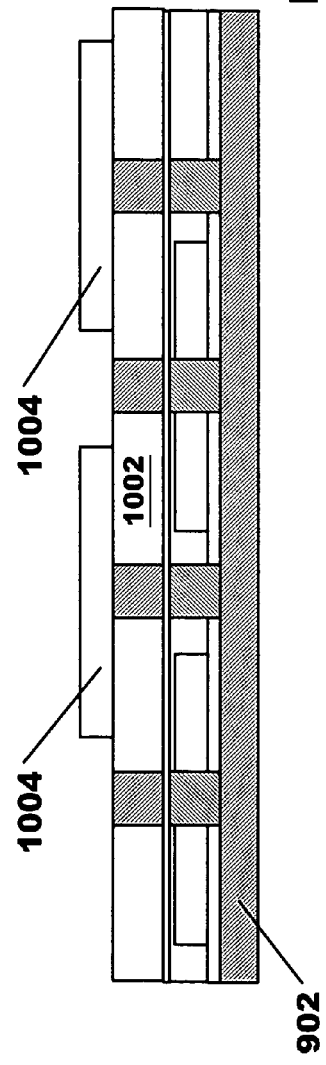
Figure 10C:
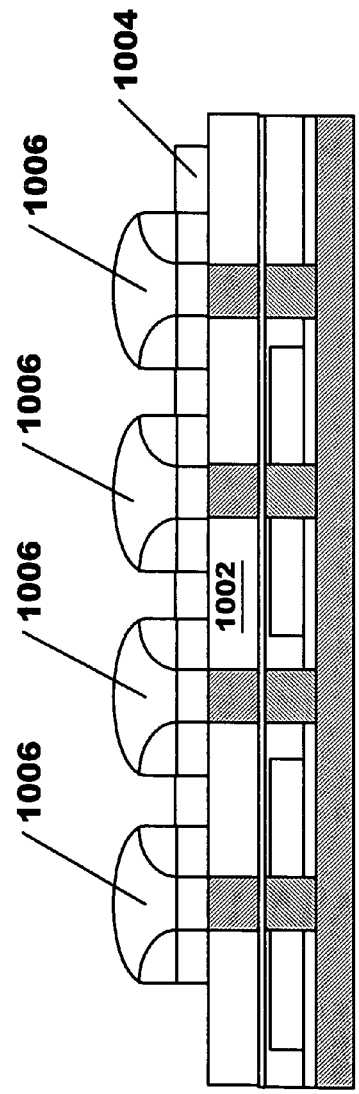

FIGS. 10a-10c are air bearing surface end views illustrating an alternative method of making a write head array having overlapping coils, according to an embodiment of the present invention. This method is utilized to make the heads of FIG. 8. The method begins by following the steps outlined in FIGS. 9a through 9f. Following step 9f, insulating layers are deposited on the upper surface of layer 912. Any suitable insulation material can be used, preferably alumina. CMP is then utilized to remove any insulation material on the top surface of the upper pole tips and to planarize the structure. In FIG. 10b, coil structures 1004 are added to the top surface of insulating layer 1002, and in accordance with the present invention, are placed so that they overlap coils 906 of the adjacent heads. In FIG. 10c, yokes 1006 are added to complete the thin film head structures subsequent to the deposition of an insulation layer (not shown) over the coil structures 1004.

The present invention is not limited by the previous embodiments heretofore described. Rather, the scope of the present invention is to be defined by these descriptions taken together with the attached claims and their equivalents.

What is claimed is:

1. A thin film head array comprising:
    a first head further comprising
        a first upper pole,
        a first lower pole containing a first lower pole tip magnetically coupled to a lower pole layer, and
        a first write coil disposed between said first upper pole and said first lower pole;
    a second head further comprising
        a second upper pole,
        a second lower pole containing a second lower pole tip magnetically coupled to said lower pole layer, and
        a second write coil disposed between said second upper pole and said second lower pole;
    wherein said first head is adjacent to said second head, and a portion of said first write coil overlaps at least a portion of said second write coil.

2. The thin film head array as recited in claim 1, wherein said first write coil is disposed below said second write coil.

3. The thin film head array as recited in claim 1, wherein said first write coil is disposed above said second write coil.

4. The thin film head array as recited in claim 1, wherein
    said first upper pole comprises a first yoke and a first upper pole tip, and
    said second upper pole comprises a second yoke and a second upper pole tip.

5. The thin film head array as recited in claim 4, wherein
    a first write gap is disposed between said first upper pole tip and said first lower pole tip at an air bearing surface;
    a second write gap is disposed between said second upper pole tip and said second lower pole tip at said air bearing surface; and,
    said first write gap and said second write gap lie approximately in the same plane, said plane being perpendicular to said air bearing surface.

6. The thin film head array as recited in claim 5, wherein said first write coil is disposed above said first write gap, and said second write coil is disposed below said second write gap.

7. The thin film head array as recited in claim 6, wherein said first write coil is disposed above said first upper pole tip.

8. The thin film head array as recited in claim 5, wherein said second write coil is disposed above said second write gap, and said first write coil is disposed below said first write gap.

9. The thin film head array as recited in claim 8, wherein said second write coil is disposed above said second upper pole tip.

10. A thin film head array comprising:
    a first head further comprising
        a first upper pole containing a first upper pole tip magnetically coupled to a first yoke,
        a first lower pole containing a first lower pole tip magnetically coupled to a first lower pole layer,
        a first write coil disposed between said first upper pole and said first lower pole, and
        a first write gap disposed between said first upper pole tip and said first lower pole tip;
    a second head further comprising a second upper pole containing a second upper pole tip magnetically coupled to a second yoke, a second lower pole containing a second lower pole tip magnetically coupled to a second lower pole layer, a second write coil disposed between said second upper pole and said second lower pole, and a second write gap disposed between said second upper pole tip and said second lower pole tip;

wherein said first head is adjacent to said second head, a portion of said first write coil overlaps at least a portion of said second write coil, and said first write gap and said second write gap lie approximately in a plane perpendicular to an air bearing surface.

11. The thin film head array as recited in claim 10, wherein said first write coil is disposed below said second write coil.

12. The thin film head array as recited in claim 11, wherein said second write coil is disposed above said second upper pole tip.

13. The thin film head array as recited in claim 10, wherein said first write coil is disposed above said second write coil.

14. The thin film head array as recited in claim 13, wherein said first write coil is disposed above said first upper pole tip.

15. The thin film head array as recited in claim 10, wherein said first write coil is disposed above said first write gap, and said second write coil is disposed below said second write gap.

16. The thin film head array as recited in claim 15, wherein said first write coil is disposed above said first upper pole tip.

17. The thin film head array as recited in claim 10, wherein said second write coil is disposed above said second write gap, and said first write coil is disposed below said first write gap.

18. The thin film head array as recited in claim 17, wherein said second write coil is disposed above said second upper pole tip.

* * * * *